United States Patent
Cheng et al.

(10) Patent No.: US 10,110,273 B2
(45) Date of Patent: Oct. 23, 2018

(54) INTERFERENCE MITIGATION IN WIRELESS COMMUNICATION SYSTEMS

(71) Applicant: PERASO TECHNOLOGIES INC., Toronto (CA)

(72) Inventors: Gary Cheng, Unionville (CA); Christopher James Hansen, Los Altos, CA (US); Joseph Andonieh, Aurora (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 0 days.

(21) Appl. No.: 15/700,854

(22) Filed: Sep. 11, 2017

(65) Prior Publication Data

US 2018/0076848 A1 Mar. 15, 2018

Related U.S. Application Data

(60) Provisional application No. 62/435,471, filed on Dec. 16, 2016, provisional application No. 62/385,469, filed on Sep. 9, 2016.

(51) Int. Cl.
*H04B 1/66* (2006.01)
*H04B 15/00* (2006.01)
*H04B 1/02* (2006.01)

(52) U.S. Cl.
CPC ............. *H04B 1/66* (2013.01); *H04B 15/00* (2013.01); *H04B 1/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 2015/0103713 A1* | 4/2015 | Lee | ................... | H04W 52/0235 370/311 |
| 2015/0249990 A1* | 9/2015 | Kadiyala | ............. | H04W 72/085 370/252 |
| 2016/0119174 A1* | 4/2016 | Chavali | ............... | H04L 27/2672 370/252 |
| 2016/0330738 A1* | 11/2016 | Eitan | ................. | H04W 72/0446 |
| 2017/0013507 A1* | 1/2017 | Lee | ....................... | H04B 7/0413 |
| 2017/0238232 A1* | 8/2017 | Yang | ..................... | H04W 40/02 370/328 |

* cited by examiner

*Primary Examiner* — Junpeng Chen
(74) *Attorney, Agent, or Firm* — Perry + Currier

(57) ABSTRACT

A wireless communication assembly stores configuration parameter sets for predefined spectral masks, including: a single channel mask for a base channel bandwidth, and defining target power levels for each of a base in-band bandwidth, base transition bandwidths, and a base floor bandwidth; and a bonded channel mask for a multiple of the base channel bandwidth, and defining target power levels for each of a bonded in-band bandwidth equivalent to the sum of the base in-band bandwidth and the base channel bandwidth, and bonded transition and floor bandwidths that are multiples of the base transition and floor bandwidths. A radio controller selects predefined channels each having the base channel bandwidth, for transmitting data to a recipient station; retrieves selected one of the configuration parameter sets based on the number of selected channels; and applies the selected configuration parameter set to data for transmission to the recipient station.

12 Claims, 5 Drawing Sheets

INTERFERENCE MITIGATION IN WIRELESS COMMUNICATION SYSTEMS

CROSS-REFERENCE TO RELATED APPLICATIONS

This application claims priority from U.S. provisional patent application Nos. 62/385,469 filed Sep. 9, 2016, and 62/435,471 filed Dec. 16, 2016. The contents of each of the above applications is incorporated herein by reference.

FIELD

The specification relates generally to wireless communications, and specifically to methods and systems for mitigating interference in wireless communications systems.

BACKGROUND

Wireless signals are typically transmitted employing a certain range of frequencies (referred to as the bandwidth of the signals). The signals typically include some energy outside the target frequency band, which may interfere with receivers operating in adjacent frequency bands. Transmitters therefore apply control parameters to reduce such interference to predefined targets referred to as transmission masks or spectral masks. However, such control parameters may not account for varying transmission configurations, and may undesirably increase the cost of deploying transmitters.

SUMMARY

According to an aspect of the specification, a method in a wireless communication assembly is provided comprising: in a memory, storing respective configuration parameter sets for each of a plurality of predefined spectral masks; the plurality of spectral masks including: a single channel spectral mask corresponding to a base channel bandwidth, the single channel spectral mask defining target power levels for each of (i) a base in-band bandwidth, (ii) a plurality of base transition bandwidths, and (iii) a base floor bandwidth; and a bonded channel spectral mask corresponding to a multiple of the base channel bandwidth, the bonded channel spectral mask defining target power levels for each of (i) a bonded in-band bandwidth equivalent to the sum of the base in-band bandwidth and the base channel bandwidth, (ii) a plurality of bonded transition bandwidths each equivalent to the multiple of the base transition bandwidths; and (iii) a bonded floor bandwidth equivalent to the multiple of the base floor bandwidth; at a radio controller, selecting a subset of a plurality of predefined channels each having the base channel bandwidth, for use in transmitting data to a recipient station; at the radio controller, retrieving a selected one of the configuration parameter sets based on a number of adjacent channels in the subset; and applying the selected configuration parameter set to the data prior to transmitting the data to the recipient station over the subset of predefined channels.

BRIEF DESCRIPTIONS OF THE DRAWINGS

Figure 1:
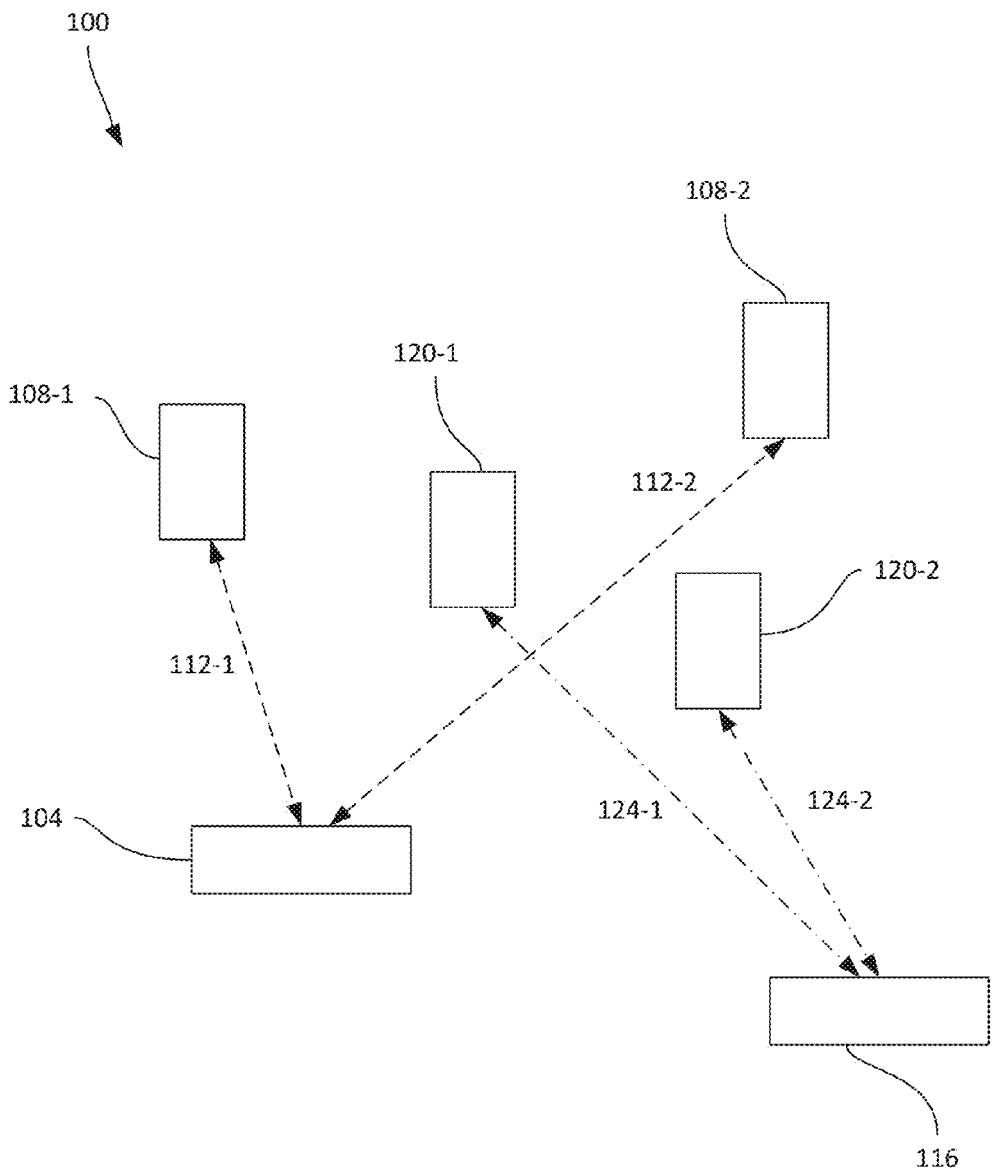
Figure 2:
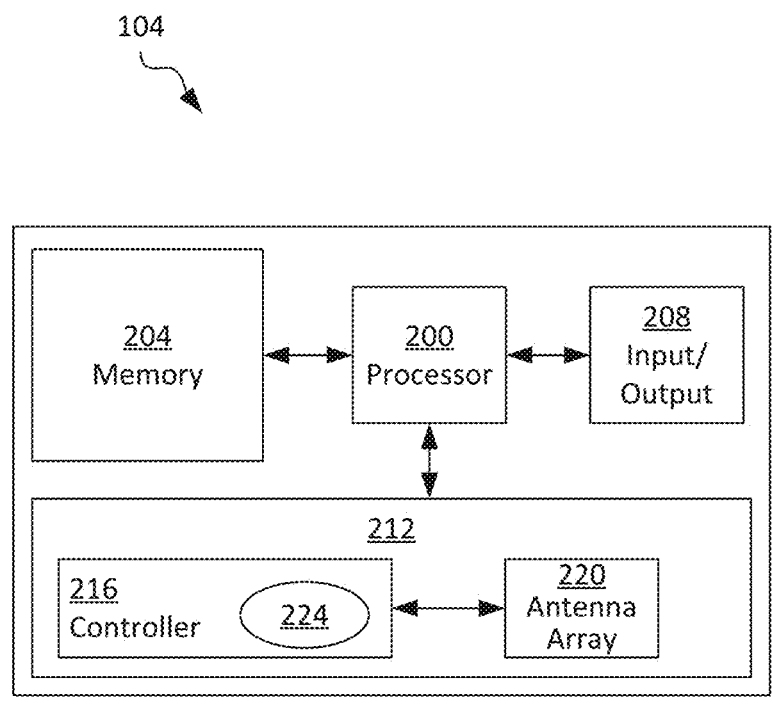
Figure 3:
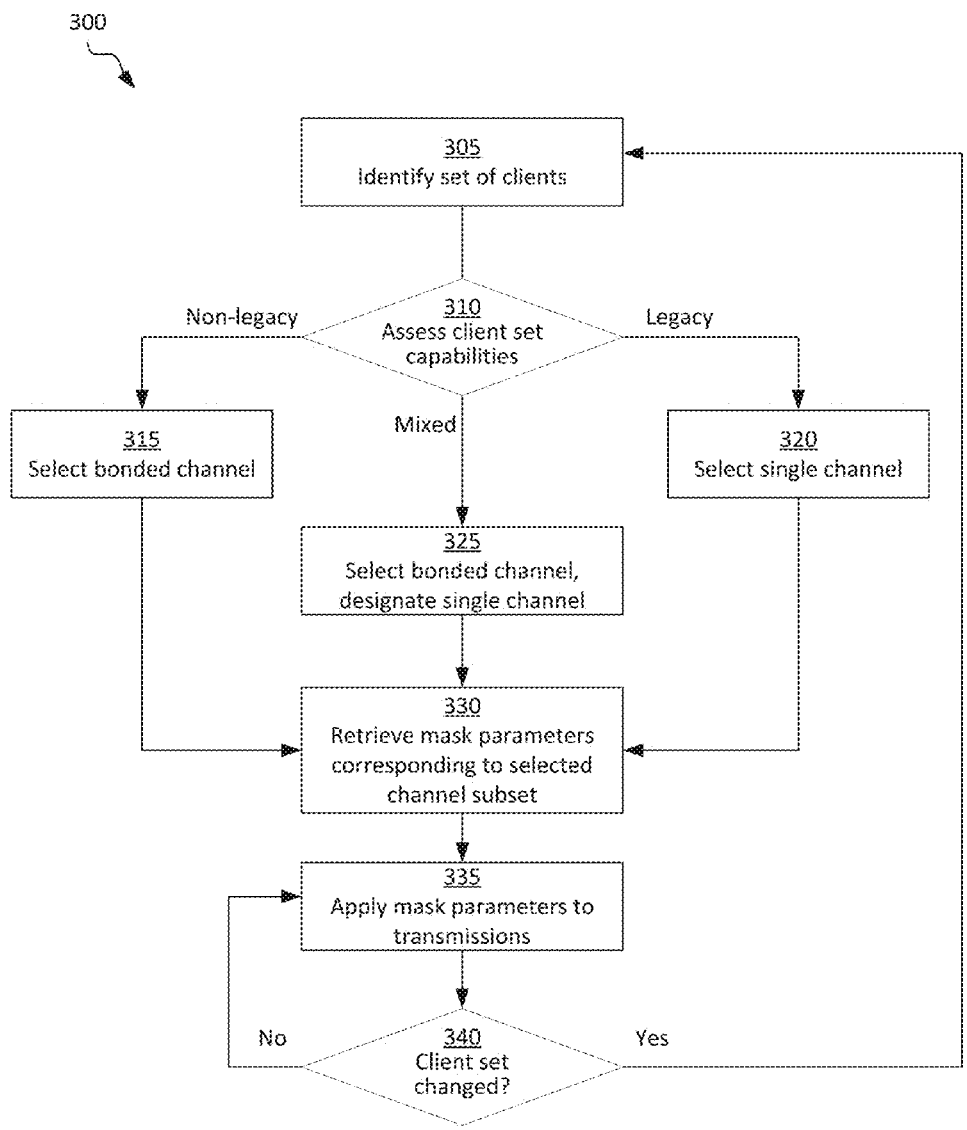
Figure 4:
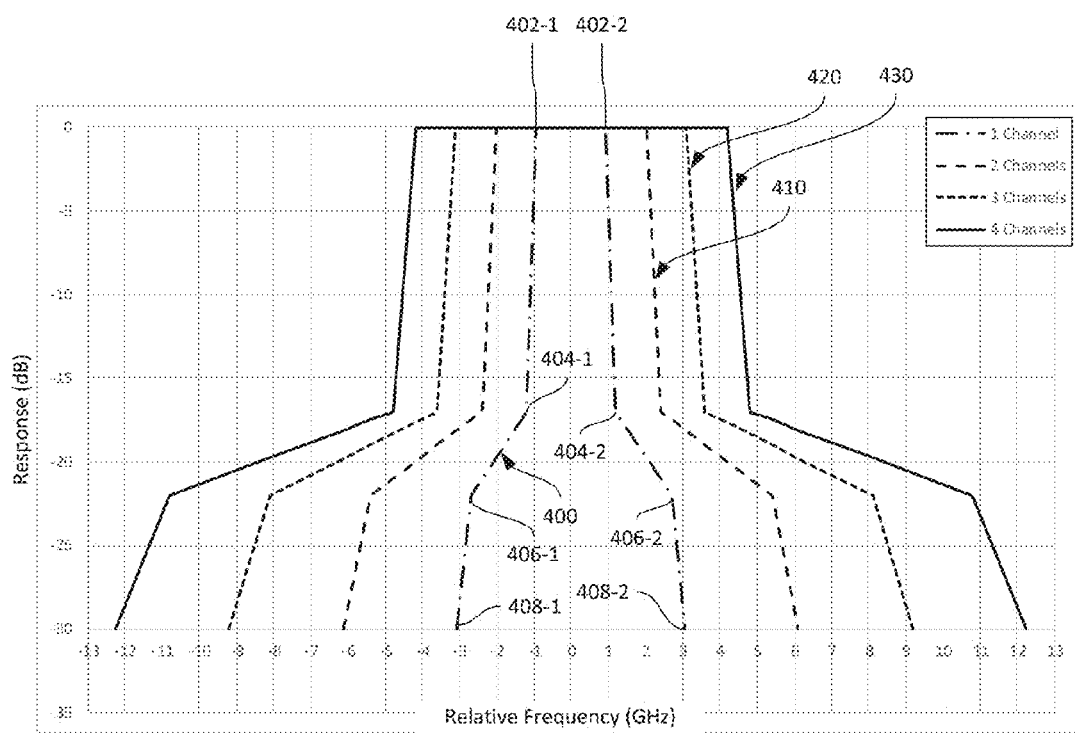
Figure 5:
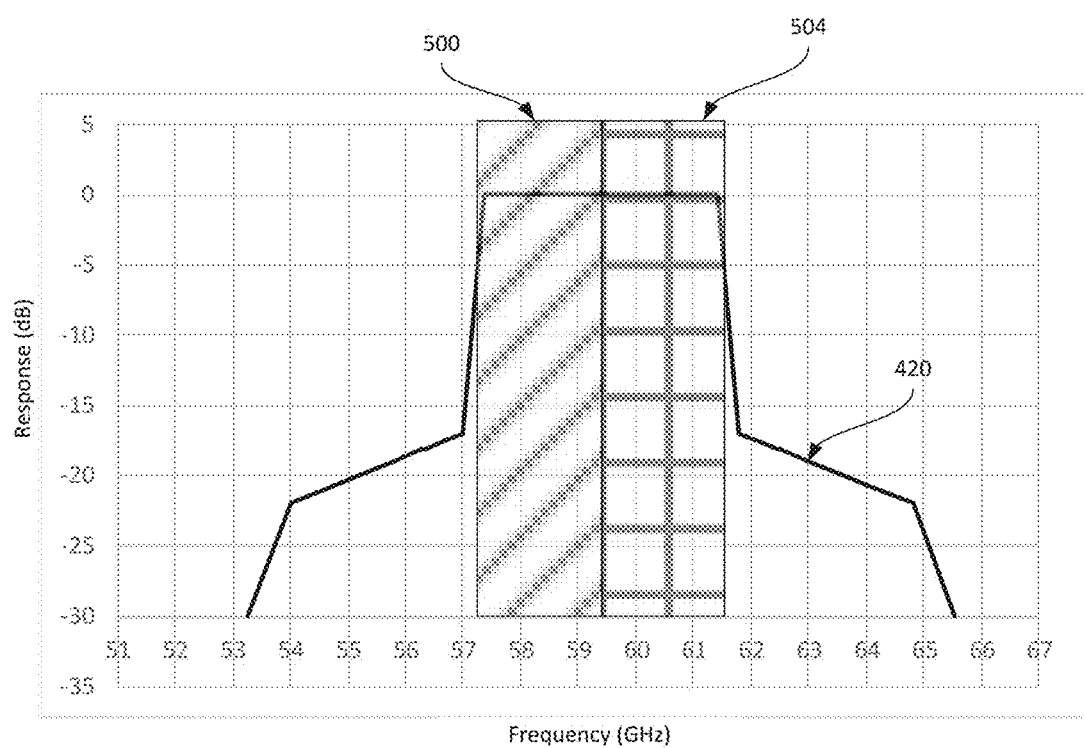

Embodiments are described with reference to the following figures, in which:

FIG. 1 depicts a wireless communications system;
FIG. 2 depicts certain internal components of a wireless communications assembly in the system of FIG. 1;
FIG. 3 depicts a method of interference mitigation in the system of FIG. 1;
FIG. 4 depicts example spectral masks employed in the performance of FIG. 3; and
FIG. 5 depicts the application of one of the masks of FIG. 4 to a bonded channel.

DETAILED DESCRIPTION

FIG. 1 depicts a wireless communications system 100, including a plurality of wireless devices. In particular, FIG. 1 illustrates a first access point 104 connected with a first client device 108-1 and a second client device 108-2 (referred to generically as a client device 108, and collectively as client devices 108; this nomenclature may also be used for other components in the discussion below) via respective wireless links 112-1 and 112-2. In addition, the system 100 includes a second access point 116 connected with further client devices 120-1 and 120-2 via respective lines 124-1 and 124-2. The access points 104 and 116 can be, for example, wireless routers connecting the client devices 108 and 120 to a wide area network (not shown) such as the Internet. The access points 104 and 116 may also be, for example, media servers, home computers, mobile devices, and the like. The client devices 108 and 120, meanwhile, can be mobile devices such as smartphones, tablet computers and the like. The client devices 108 and 120 may also be access points themselves, for example in implementations in which the access points 104 and 116 form components in a backhaul infrastructure. More generally, the access points 104 and 116, as well as the client devices 108 and 120, can include any suitable combination of computing devices with wireless communication assemblies suitable for communicating with one another.

In the examples discussed below the devices of the system 100 each include a wireless communications assembly configured to implement a shared wireless communication standard. More specifically, the devices of the system 100 are each configured to communicate according to a wireless standard employing frequencies of around 60 GHz (also referred to as WiGig). Examples of such standards are the IEEE 802.11ad standard, and enhancements thereto (e.g. 802.11ay). As will be apparent, therefore, the devices of the system 100 employ a common set of carrier frequencies, and transmissions over some or all of the links 112 and 124 may interfere with each other. Such interference may lead to packet loss or other undesirable decreases in wireless data transfer performance. To mitigate such interference, the devices of the system 100 typically select among a variety of available channels predefined by the above mentioned wireless standard. For example, the 802.11ad and 802.11ay standards define four channels, having center frequencies of 58.32 GHz, 60.48 GHz, 62.64 GHz and 64.8 GHz, and bandwidths of 2.16 GHz. However, devices transmitting on each of the above-mentioned channels typically also emit interference on adjacent channels. The 802.11ad standard, therefore, defines a spectral mask to be applied by transmitting devices, to limit the power of emitted interference on adjacent channels to predefined target power levels relative to the maximum power of the transmission.

The conventional spectral mask for 60 GHz transmissions defined by the 802.11ad standard, however, fails to account for channel bonding, by which data may be transmitted employing more than one of the above-mentioned channels simultaneously. Further, approaches to configuring conventional multi-channel masks at transmission frequencies other than 60 GHz may not be suitable for transmissions at 60

GHz. As will be discussed in greater detail below, the devices 104, 108, 116 and 120 are therefore configured to perform various actions, including deploying multi-channel masks, to reduce the effects of interference in other channels caused by transitions in a given channel.

Turning now to FIG. 2, before describing the operation of the devices of the system 100 to implement the interference-reducing actions mentioned above, certain components of the access point 104 (also referred to below simply as the device 104) will be described. The description of the device 104 below also applies to the devices 108, 116 and 120. That is, the devices 108, 116 and 120 also each include the components discussed below, though it will be understood that the particular implementation of each component may vary from device to device.

The device 104 includes a central processing unit (CPU), also referred to as a processor 200. The processor 200 is interconnected with a non-transitory computer readable storage medium, such as a memory 204, having stored thereon various computer readable instructions for performing various actions (e.g. streaming media to the device 108). The memory 204 includes a suitable combination of volatile (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The device 104 also includes one or more input devices, and one or more output devices, generally indicated as an input/output device 208. The input and output devices 208 serve to receive commands for controlling the operation of the device 104 and for presenting information, e.g. to a user of the device 104. The input and output devices 208 therefore include any suitable combination of devices, including a keyboard, a mouse, a display, a touchscreen, a speaker, a microphone, and the like). In other embodiments, the input and output devices may be connected to the processor 200 via a network, or may simply be omitted.

The device 104 further includes a wireless communications assembly 212 interconnected with the processor 200. The assembly 212 enables the device 104 to communicate with other computing devices. In the present example, as noted earlier, the assembly 212 enables such communication according to the IEEE 802.11ay standard, and thus transmits and receives data at frequencies of around 60 GHz.

The communications assembly 212 includes a controller 216 in the form of one or more integrated circuits, configured to establish and maintain communications links with other devices (e.g., links 112-1 and 112-2). The controller 216 is also configured to process outgoing data for transmission via an antenna array 220 (e.g. a phased array of antenna elements) and to receive incoming transmissions from the array 220 and process the transmissions for communication to the processor 200. The controller 216, in the present example, therefore includes a baseband processor and a transceiver (also referred to as a radio processor), which may be implemented as distinct hardware elements or integrated on a single circuit. In other embodiments, the device 104 may include a plurality of controllers 216 and corresponding antenna arrays 220 within the communications interface 212.

Further, the controller 216 is configured to execute various computer-readable instructions (e.g. stored in a memory element integrated with the controller 216 or implemented as a discrete hardware component of the assembly 212 and connected with the controller 216) in the form of a control application 224 for performing the above functions. The control application 224 may be implemented as a software driver deployed to the assembly 212, for example via the processor 200. Via the execution of the application 224, the controller 216 is configured to operate the wireless communications assembly 212 to select transmission channels, and to retrieve and implement one of a plurality of spectral masks stored in the memory of the controller 216. As will be discussed in greater detail below, the controller 216 stores, either in the memory 204 or in a non-transitory memory integrated with the controller 216 itself, a plurality of configuration parameter sets for each of a plurality of predefined spectral masks.

Turning now to FIG. 3, a method 300 of mitigating interference in wireless transmissions is depicted. The method 300 will be described in connection with its performance on the device 104, as illustrated in FIGS. 1 and 2. The blocks of the method 300 are performed by the controller 216 of the communications interface 212, via the execution of the application 224.

At block 305, the device 104 is configured to identify a set of client devices with which the device 104 has established connections or is in the process of establishing connections. The client devices are referred to in the discussion below as clients because, in the present example, the device 104 is an access point. In other examples, however, the device 104 and the client devices may be peers, or one of the client devices may itself be an access point. In general, the client devices, in the context of the discussion herein, are devices to which the device 104 transmits data. The identification of client devices typically includes receiving device identifiers from the client devices (e.g. in response to a beacon transmitted periodically by the device 104), and may also include receiving capability information from each client device, as will be discussed below.

At block 310, the device 104 is configured to assess the capabilities of each client device in the set identified at block 305. Thus, in the present example, the device 104 is configured to assess the capability information received or otherwise derived from data received from the devices 108-1 and 108-2 during the establishment of the links 112-1 and 112-2. In particular, the device 104 is configured to assess whether each client device 108 is a legacy device or a non-legacy device. In the context of this discussion, a legacy device is a client device that is capable of communicating over a single one of the four channels mentioned above at any given time. In other words, a legacy device may be a device that implements the 802.11ad standard, but not the 802.11ay enhancement to that standard. A non-legacy device, however, is a device that is capable of communicating over a bonded channel, consisting of two or more of the above-mentioned channels. More specifically, a bonded channel consists of two to four adjacent channels among the four mentioned above.

When the assessment at block 310 indicates that the client devices in the set identified at block 305 are all non-legacy clients, the device 104 is configured to select a bonded channel at block 315 for use in establishing the links 112 to each client device 108 and transmitting data over the links 112. For example, when the devices 108-1 and 108-2 are both non-legacy devices, the device 104 may be configured to select a bonded channel consisting of channels 1 and 2 (i.e. the channels centered at 58.32 GHz and 60.48 GHz) at block 315. As a result, the links 112-1 and 112-2 are established using the selected bonded channel for data transmission. As will now be apparent, the selected bonded channel has a center frequency of 58.86 GHz.

When the assessment at block 310 indicates that the client devices in the set identified at block 305 are all legacy devices, the device 104 is configured to select a single channel at block 320 for use in establishing the links 112 to each client device 108 and transmitting data over the links 112. For example, when the devices 108-1 and 108-2 are both legacy devices, the device 104 may be configured to select channel 1 (having a center frequency of 58.32 GHz) at block 320. As a result, the links 112-1 and 112-2 are established using the selected single channel for data transmission.

When the assessment at block 310 indicates, however, that a subset of the client devices 108 identified at block 305 are legacy devices, and that a further subset of the client devices 108 identified at block 305 are non-legacy devices (i.e. that the capabilities of the client device set are mixed), the device 104 is configured to proceed instead to block 325. For example, the client device 108-1 may be a non-legacy device, while the client device 108-2 may be a legacy device.

At block 325, the device 104 is configured to select a bonded channel (e.g. the combination of channels 1 and 2 mentioned above in connection with block 315) for communications with the non-legacy devices of the client set. The device 104 is also configured to designate a single channel among the channels employed in the selected bonded channel, for communications with the legacy device. In other words, the device 104, having selected a bonded channel formed from channels 1 and 2, is configured to designate one of channels 1 and 2 for legacy device communications (rather than, for example, channel 3 or channel 4).

At block 330, the device 104 (and specifically, as noted earlier, the controller 216) is configured to retrieve a selected one of the above-mentioned configuration parameter sets from the memory (e.g., a memory component integrated with the controller 216). Before discussing the selection of a configuration parameter set at block 330 in greater detail, the configuration parameter sets themselves will be discussed.

The controller 216, as noted above, is configured to store at least one configuration parameter set for each of a plurality of spectral masks. Each configuration parameter set includes a plurality of settings applied to components of the controller 216 to implement a corresponding spectral mask. As will be apparent to those skilled in the art, the configuration parameter sets therefore include any suitable one of, or any suitable combination of, digital filter settings (e.g. cutoff frequencies), analog filter settings, back-off settings for one or more power amplifiers, gain settings for the above-mentioned amplifiers, oscillator frequency settings, and the like. The configuration parameters of a given one of the above sets, when applied by the controller 216, configure to the communications interface 212 to limit interference in adjacent channels to those selected at blocks 315, 320 and 325. Specifically, each spectral mask defines a plurality of bandwidths, and for of the bandwidths, a target transmitted power level (relative to the maximum power transmitted in the selected channel) to be achieved by the communications interface 212. The target levels need not be reached in practice by the device 104; rather, the target levels are typically specified as being achieved under predefined test conditions.

The spectral masks implemented by the above-mentioned sets of configuration parameters include at least a single channel spectral mask corresponding to a base channel bandwidth. In the present example, the base channel bandwidth is the bandwidth of a single one of the above-mentioned four channels (i.e., 2.16 GHz). The single channel spectral mask defines target power levels for each of (i) a base in-band bandwidth, (ii) a plurality of base transition bandwidths, and (iii) a base floor bandwidth.

The spectral masks implemented by the above-mentioned sets of configuration parameters also include at least one bonded channel spectral mask. The bonded channel spectral mask defines target power levels for a bonded in-band bandwidth equivalent to the sum of the base in-band bandwidth defined by the single channel mask and one or more multiples of the base channel bandwidth (2.16 GHz), the multiple dependent on the number of the available channels that are combined to form the corresponding bonded channel. The bonded channel spectral mask also defines target power levels for each of (i) a plurality of bonded transition bandwidths each equivalent to a multiple of the base transition bandwidths for the same levels; and (ii) a bonded floor bandwidth equivalent to the same multiple of the base floor bandwidth. As will be seen below, in the present example the configuration parameter sets implement the single channel mask and three bonded channel masks, corresponding to bonded channel widths of 2, 3 and 4 channels (i.e., bonded channel bandwidths of 4.32 GHz, 6.48 GHz and 8.64 GHz).

Turning to FIG. 4, a single channel mask 400 is shown, as are a plurality of bonded channel masks 410, 420 and 430. The bonded masks 410, 420 and 420 correspond, respectively, to bonded channel widths of 4.32 GHz, 6.48 GHz and 8.64 GHz (i.e., combinations of two, three and four adjacent ones of the standard-defined channels mentioned earlier).

The mask 400 includes a target power level of 0 dB relative to the maximum emitted power for an in-band bandwidth defined by in-band vertices 402-1 and 402-2 (all bandwidths are illustrated in FIG. 4 by boundary frequencies relative to the center frequency of the underlying single or bonded channels, which may vary depending on the selections made at blocks 315, 320 and 325). The mask 400 also includes two transition bandwidths defined by respective pairs of vertices 404-1 and 404-2, as well as 406-1 and 406-2. Finally, the mask 400 includes a floor bandwidth defined by vertices 408-1 and 408-2. Each of the above-mentioned bandwidths is associated with a target power level. For example, the second transition bandwidth defined by the vertices 406-1 and 406-2 is associated with a target power level of −22 dB relative to a maximum emitted power. The masks 410, 420 and 430 each include similar sets of vertices. Tables 1 to 4 below illustrate the values of the vertices and associated target power levels.

TABLE 1

Vertices and Target Levels for Single Channel Mask 400

|  | 1$^{st}$ Boundary (GHz relative to center) | 2$^{nd}$ Boundary (GHz relative to center) | Target Power Level (dB relative to max) |
|---|---|---|---|
| In-band | −0.94 | 0.94 | 0 |
| Transition 1 | −1.20 | 1.20 | −17 |
| Transition 2 | −2.70 | 2.70 | −22 |
| Floor | −3.06 | 3.06 | −30 |

TABLE 2

Vertices and Target Levels for Bonded Channel Mask 410

| | 1st Boundary (GHz relative to center) | 2nd Boundary (GHz relative to center) | Target Power Level (dB relative to max) |
|---|---|---|---|
| In-band | −2.02 | 2.02 | 0 |
| Transition 1 | −2.40 | 2.40 | −17 |
| Transition 2 | −5.40 | 5.40 | −22 |
| Floor | −6.12 | 6.12 | −30 |

TABLE 3

Vertices and Target Levels for Bonded Channel Mask 420

| | 1st Boundary (GHz relative to center) | 2nd Boundary (GHz relative to center) | Target Power Level (dB relative to max) |
|---|---|---|---|
| In-band | −3.10 | 3.10 | 0 |
| Transition 1 | −3.60 | 3.60 | −17 |
| Transition 2 | −8.10 | 8.10 | −22 |
| Floor | −9.19 | 9.19 | −30 |

TABLE 4

Vertices and Target Levels for Bonded Channel Mask 430

| | 1st Boundary (GHz relative to center) | 2nd Boundary (GHz relative to center) | Target Power Level (dB relative to max) |
|---|---|---|---|
| In-band | −4.18 | 4.18 | 0 |
| Transition 1 | −4.80 | 4.80 | −17 |
| Transition 2 | −10.80 | 10.80 | −22 |
| Floor | −12.24 | 12.24 | −30 |

As seen from the values above defining the spectral masks 400-430, the bandwidth of each bonded in-band region is defined as the single channel in-band region (with a bandwidth of 1.88 GHz) summed with a multiple of the base channel bandwidth (2.16 GHz). The multiple corresponds to one less than the number of base channels employed in forming the bonded channel. Thus, for example, the in-band bandwidth of the mask 420, which corresponds to a bonded channel formed from three of the base channels, has a bandwidth equal to the sum of 1.88 GHz and two base channel bandwidths (i.e. 4.32 GHz). In other words, the in-band bandwidth defined by the in-band vertices of the mask 420 is 6.2 GHz.

The transition and floor bandwidths of the bonded channel masks, however, are defined differently from the in-band bandwidths. In other words, the in-band bandwidths for the bonded channel masks are the only bandwidths defined as set out above. The transition and floor bandwidths are scaled linearly relative to the corresponding transition and floor bandwidths of the single channel mask. In particular, the transition and floor bandwidths for bonded channel masks are each equal to the corresponding single channel mask bandwidth, multiplied by the number of channels employed to form the bonded channel. Thus, referring again to the mask 420 as an example, the second transition bandwidth is defined by vertices with values equal to three times the vertices 406-1 and 406-2.

In some embodiments, more than one configuration parameter set may be stored for each of the above-mentioned spectral masks 400-430. For example, different sets of configuration parameters may be stored for implementing the same mask at different temperatures, different center frequencies, and the like. For example, different sets of configuration parameters may be employed to implement the mask 410 for a bonded channel formed from the channels centered at 58.32 GHz and 60.48 GHz, than to implement the mask 410 for a bonded channel formed from the channels centered at 60.48 GHz and 62.64 GHz.

The configuration parameter set retrieved at block 330 is selected based on the spectral mask to be implemented. The spectral mask to be implemented, in turn, is the one of the masks set out above that corresponds to the number of adjacent channels selected for use at blocks 315 or 325, or the single channel selected for use at block 320. Thus, if a bonded channel formed from two of the channels defined in the 802.11ad standard is selected at block 315, a configuration parameter set is retrieved at block 330 that corresponds to the mask 410. Of particular note, when the device 104 arrives at block 330 from block 325, the number of channels forming the bonded channel selected at block 325 is employed at block 330, as opposed to the designated single legacy channel. In other words, one of the masks 410, 420 and 430 is selected at block 330, and not the mask 400 (which corresponds to the single channel designated for use with the legacy devices in the client set).

Returning to FIG. 3, at block 335 the device 104 is configured to apply the selected configuration parameters to transmissions directed to each of the set of client devices 108. That is, the same configuration parameters (and therefore, the same spectral mask) are applied to transmissions to both non-legacy devices and legacy devices in the client set. As will be apparent, transmissions to legacy devices encode the data to be transmitted in the designated channel, and typically encode whitespace in the remainder of the bonded channel selected at block 325. FIG. 5, for example, illustrates the application of the mask 420 to a bonded channel consisting of channels 1 and 2 (labelled as 500 and 504, respectively). However, the bonded channel mask is applied to the transmission rather than a separately selected single channel mask. The use of a single mask with a mixed client set as described above may reduce r eliminate the time that would otherwise be required to switch between bonded and single channel masks (e.g. by applying new settings to a local oscillator and waiting for the oscillator to settle).

At block 340, the device 104 is configured to determine whether the set of client devices identified at block 305 has changed (e.g. whether a previously unidentified device 108 has contacted the device 104, or whether a previously identified device 108 is no longer present). When the determination is negative, the performance of block 335 continues. When the determination is affirmative, the device 104 returns to block 305 to identify the updated set of client devices 108.

In some embodiments, the controller 216 stores one or more sets of configuration parameters for implementing one or more intermediate spectral masks, for use following the performance of block 325. As will now be apparent, the use of a bonded channel spectral mask when transmitting data using the single designated channel selected at block 325 results in the emission of signals on the undesignated channel(s) that do not encode data, but that may nevertheless interfere with transmissions from other devices. Intermediate masks may therefore be defined for use in mixed client set situations such as that described above. For example, three additional intermediate masks may be defined by three or more additional configuration parameter sets. Each intermediate mask is a mixed-mode mask, with in-band, transition and floor bandwidths that are between those of the single channel mask 400 and respective ones of the bonded channel masks 410, 420 and 430. For example, a mixed-mode mask for use following selection of a bonded channel with a bandwidth of 8.64 GHz may have vertices between those of the mask 430 and those of the mask 410. In some examples, the vertices of such a mask may be between those of the mask 430 and those of the mask 420.

Those skilled in the art will appreciate that in some embodiments, the functionality of the controller 216 and the application 224 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method in a wireless communication assembly, comprising:
   in a memory, storing respective configuration parameter sets for each of a plurality of predefined spectral masks; the plurality of spectral masks including:
      a single channel spectral mask corresponding to a base channel bandwidth, the single channel spectral mask defining target power levels for each of (i) a base in-band bandwidth, (ii) a plurality of base transition bandwidths, and (iii) a base floor bandwidth; and
      a bonded channel spectral mask corresponding to a multiple of the base channel bandwidth, the bonded channel spectral mask defining target power levels for each of (i) a bonded in-band bandwidth equivalent to a sum of the base in-band bandwidth and the base channel bandwidth, (ii) a plurality of bonded transition bandwidths each equivalent to the multiple of the base transition bandwidths; and (iii) a bonded floor bandwidth equivalent to the multiple of the base floor bandwidth;
   at a radio controller, selecting a subset of a plurality of predefined channels each having the base channel bandwidth, for use in transmitting data to a recipient station;
   at the radio controller, retrieving a selected one of the configuration parameter sets based on a number of adjacent channels in the subset;
   applying the selected configuration parameter set to the data prior to transmitting the data to the recipient station over the subset of predefined channels;
   at the radio controller, identifying a set of client devices and assessing the capabilities of each receiving device in the set to determine whether the set of client devices includes a combination of non-legacy client devices and legacy client devices; and
   at the radio controller, when the set of client devices includes a combination of non-legacy client devices and legacy client devices, selecting a subset of at least two channels from the predefined channels;
   wherein the transmitting comprises encoding the data across the at least two channels for the non-legacy client devices, and encoding (i) the data in a single one of the at least two channels and (ii) whitespace in the others of the at least two channels for the legacy client devices.

2. The method of claim 1, wherein the single channel spectral mask includes two transition bandwidths, such that a first transition region is defined between the base in-band bandwidth and a first one of the base transition bandwidths, a second transition region is defined between the first base transition bandwidth and a second one of the base transition bandwidths, and a third transition region is defined between the second base transition bandwidth and the base floor bandwidth.

3. The method of claim 1, further comprising:
   applying the selected configuration parameter set to transmissions to the legacy client devices and the non-legacy client devices.

4. The method of claim 1, further comprising storing an additional configuration parameter set corresponding to an intermediate spectral mask defining target power levels for each of (i) an intermediate in-band bandwidth, (ii) a plurality of intermediate transition bandwidths, and (iii) an intermediate floor bandwidth; wherein the retrieving comprises retrieving the additional configuration parameter set when the determination is affirmative.

5. The method of claim 4, wherein the intermediate in-band bandwidth has a value between the base in-band bandwidth and the bonded in-band bandwidth.

6. The method of claim 1, further comprising:
   detecting a change in the set of client devices; and
   repeating the selecting, the retrieving and the applying.

7. A wireless communications assembly, comprising:
   a memory storing respective configuration parameter sets for each of a plurality of predefined spectral masks; the plurality of spectral masks including:
      a single channel spectral mask corresponding to a base channel bandwidth, the single channel spectral mask defining target power levels for each of (i) a base in-band bandwidth, (ii) a plurality of base transition bandwidths, and (iii) a base floor bandwidth; and
      a bonded channel spectral mask corresponding to a multiple of the base channel bandwidth, the bonded channel spectral mask defining target power levels for each of (i) a bonded in-band bandwidth equivalent to a sum of the base in-band bandwidth and the base channel bandwidth, (ii) a plurality of bonded transition bandwidths each equivalent to the multiple of the base transition bandwidths; and (iii) a bonded floor bandwidth equivalent to the multiple of the base floor bandwidth; and
   a radio controller configured to:
      select a subset of a plurality of predefined channels each having the base channel bandwidth, for use in transmitting data to a recipient station;
      retrieve a selected one of the configuration parameter sets based on a number of adjacent channels in the subset; and
      apply the selected configuration parameter set to the data prior to transmitting the data to the recipient station over the subset of predefined channels;
      identify a set of client devices and assess the capabilities of each receiving device in the set to determine whether the set of client devices includes a combination of non-legacy client devices and legacy client devices;
      when the set of client devices includes a combination of non-legacy client devices and legacy client devices, select a subset of at least two channels from the predefined channels; and
      encode the data across the at least two channels for transmission to the non-legacy client devices, and encoding (i) the data in a single one of the at least two channels and (ii) whitespace in the others of the at least two channels for transmission to the legacy client devices.

8. The wireless communications assembly of claim 7, wherein the single channel spectral mask includes two transition bandwidths, such that a first transition region is defined between the base in-band bandwidth and a first one of the base transition bandwidths, a second transition region is defined between the first base transition bandwidth and a second one of the base transition bandwidths, and a third transition region is defined between the second base transition bandwidth and the base floor bandwidth.

9. The wireless communications assembly of claim 7, the radio controller further configured to:

apply the selected configuration parameter e to transmissions to the legacy client devices and the non-legacy client devices.

10. The wireless communications assembly of claim 7, the memory storing an additional configuration parameter set corresponding to an intermediate spectral mask defining target power levels for each of (i) an intermediate in-band bandwidth, (ii) a plurality of intermediate transition bandwidths, and (iii) an intermediate floor bandwidth;

wherein the radio controller is configured to retrieve the additional configuration parameter set when the determination is affirmative.

11. The wireless communications assembly of claim 10, wherein the intermediate in-band bandwidth has a value between the base in-band bandwidth and the bonded in-band bandwidth.

12. The wireless communications assembly of claim 7, the radio controller further configured to:

detect a change in the set of client devices; and
repeat the selecting, the retrieving and the applying.

* * * * *